O. GLENN.
SAFETY DEVICE FOR MINE CAGES.
APPLICATION FILED SEPT. 25, 1919.
1,391,539. Patented Sept. 20, 1921.
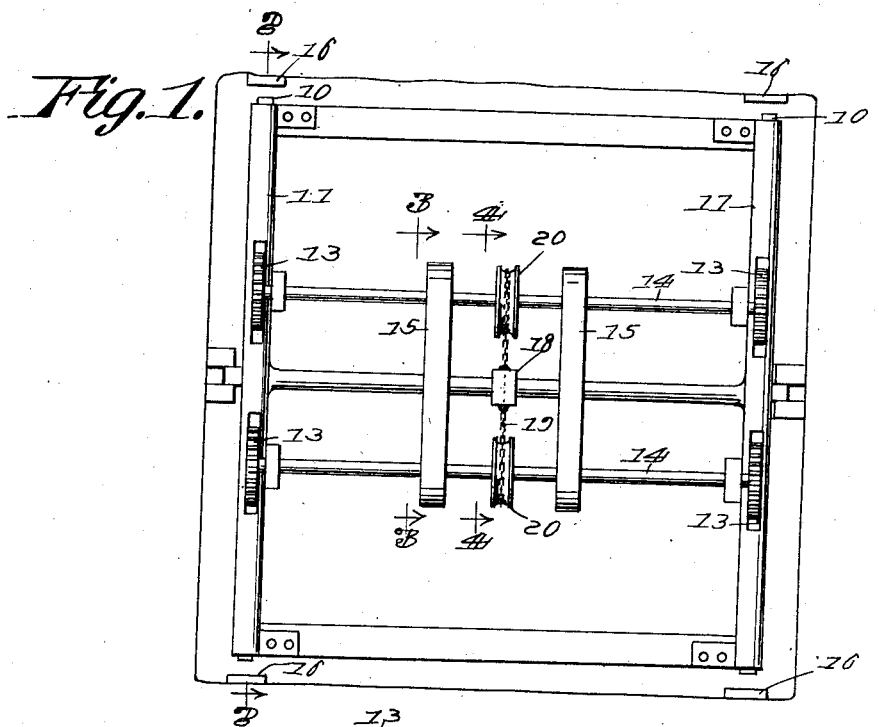
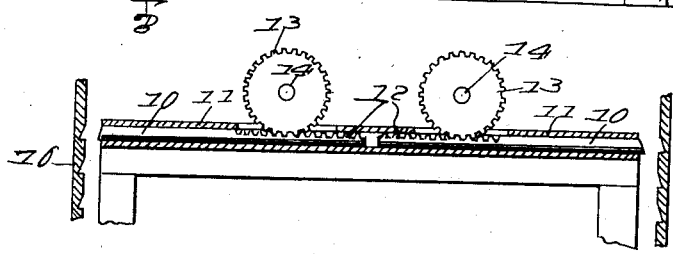
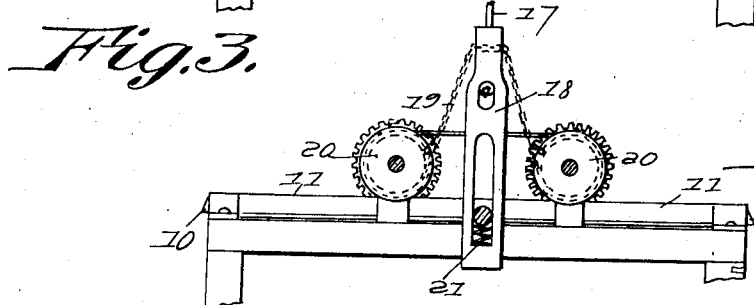
Inventor
Oscar Glenn,
By
Attorney

UNITED STATES PATENT OFFICE.

OSCAR GLENN, OF BUTTE, MONTANA.

SAFETY DEVICE FOR MINE-CAGES.

1,391,539.  Specification of Letters Patent.  Patented Sept. 20, 1921.

Application filed September 25, 1919. Serial No. 326,198.

*To all whom it may concern:*

Be it known that OSCAR GLENN, a citizen of the United States of America, residing at Butte, in the county of Silver Bow and State of Montana, has invented new and useful Improvements in Safety Devices for Mine-Cages, of which the following is a specification.

The object of the invention is to provide a simple and relatively inexpensive safety device adapted for automatic operation to lock a mine cage or car against falling movement in the event of breakage of the supporting cable or other similar injury to the mechanism, and to this end the invention consists in a construction and combination of parts of which a preferred embodiment is shown in the accompanying drawing, wherein:

Figure 1 is a plan view of the apparatus applied in the operative position to a mine cage or car.

Fig. 2 is a sectional view on the plane indicated by the line 2—2 of Fig. 1.

Fig. 3 is a section on the line 3—3 of Fig. 1.

Fig. 4 is a sectional view on the line 4—4 of Fig. 1.

Essentially the device consists of bolts 10 mounted in suitable guides 11 and having rack teeth 12 for engagement by pinions 13 of which the spindles 14 are actuated by springs 15 under such conditions that when the spindles are released the tendency of the springs is to turn the pinions to extend the bolts into engagement with racks 16 which are located on the side walls of the mine shaft or the framework within which the cage or car is guided.

The car or cage supporting cable 17 is connected with a vertically movable head 18 through which extends a retaining chain or cable 19 terminally reeled upon drums 20 secured to the spindles 14 so that when the car is supported by the cable 17 under normal conditions and the head 18 is thereby retained in its elevated position in relation to the car or cage as shown in Fig. 4, the strain upon the retaining chain or cable 19 serves to hold the spindles 14 in opposition to the impulse of the springs 15 and hence maintain the bolts in their retracted positions as indicated in Fig. 2. In the event that the supporting cable should break the head 18 is free to drop by gravity as well as under the impulse of a cushioning spring 21 to relieve the retaining chain or cable 19 of strain and thus release the spindles 14 so that they may be turned by the springs 15 to project the bolts 10 into engagement with the racks 16 to catch and support the car or cage.

What is claimed is:

1. A safety device for mine cars or cages having car carried bolts for engagement with stationary racks, spring actuated spindles having gears engaged with teeth on said bolts to impart rack engaging movement to the latter, drums carried by the spindles, a retaining chain reeled upon the drums and adapted when strained to impart bolt retracting movement to the spindles, and a cable and a movable head connected with the car supporting cable and engaged with said retaining chain for normally maintaining the latter under tension.

2. A safety device for mine cars having car carried bolts for engagement with stationary racks, spindles operatively connected with said bolts to impart longitudinal movement to the latter upon turning movement of the spindles, springs spanning the spindles and terminally connected to the same to rotate them in opposite directions, drums carried by the spindles, a retaining chain reeled upon the drums and adapted when strained to impart bolt retracting movement to the spindles in opposition to the action of the springs, and a cable actuated element engaged with said retaining chain to normally maintain the latter under tension.

In testimony whereof he affixes his signature.

OSCAR GLENN.